Jan. 30, 1962 C. L. KLAGES ETAL 3,018,675
BORING BAR
Filed Nov. 23, 1959
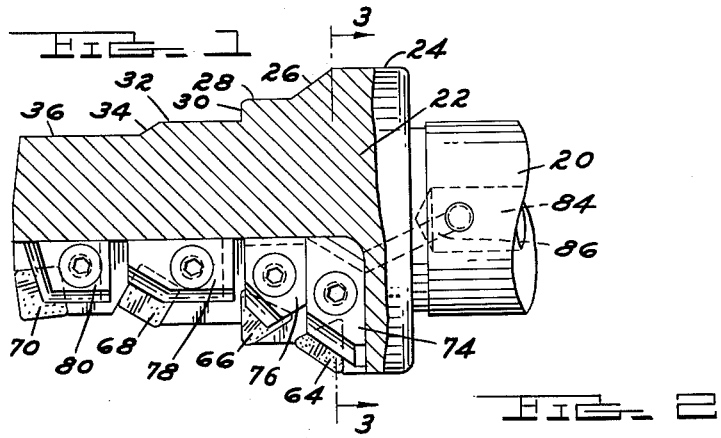
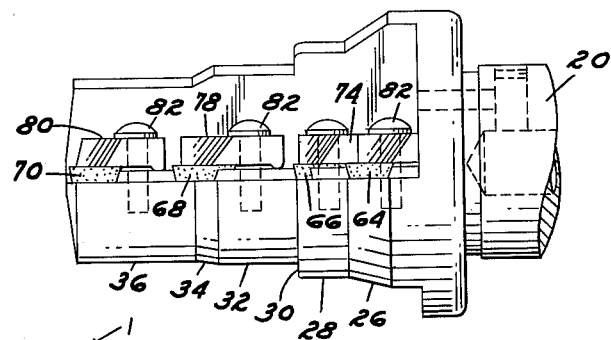
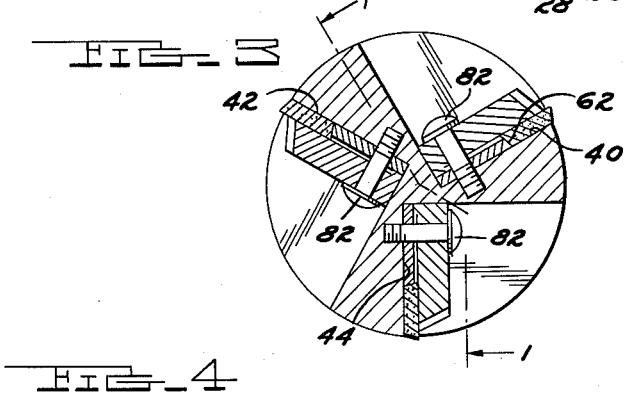
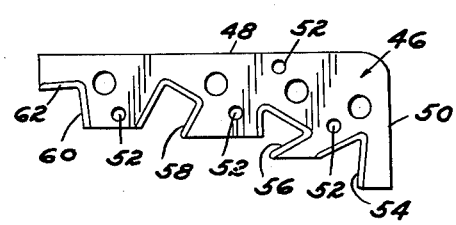
INVENTORS
CHRISTIAN L. KLAGES
JACK O. SULLIVAN
BY
Barnes, Kisselle, Raisch & Choate
ATTORNEYS

United States Patent Office

3,018,675
Patented Jan. 30, 1962

3,018,675
BORING BAR
Christian L. Klages and Jack O. Sullivan, Brighton, Mich., assignors, by mesne assignments, to Wesson Corporation, Ferndale, Mich., a corporation of Delaware
Filed Nov. 23, 1959, Ser. No. 854,889
2 Claims. (Cl. 77—58)

This invention relates to a boring bar and has particularly to do with a boring bar which has a multiplicity of cutting bits disposed thereon.

It is an object of the invention to provide a boring bar which positively locates cutting bits in a plurality of positions relative to each other while making it possible also to index these bits as the cutting edges wear while retaining the same relative location for the bits.

Other objects and features of the invention relating to details of construction and operation will be apparent in the following description and claims.

Drawings accompany the disclosure and the various views thereof may be briefly described as:

FIGURE 1, an axial section of the unit showing the relative location of the parts.

FIGURE 2, an elevation of the assembled boring bar.

FIGURE 3, a transverse section on line 3—3 of FIGURE 1.

FIGURE 4, a plan view of a locating element.

Referring to the drawings:

A boring bar having a shank 20 has a head portion 22 which is stepped down from a cylindrical portion 24 to a tapered section 26, a second cylindrical portion 28, a shoulder 30, a third cylindrical portion 32, a second tapered portion 34 and a fourth cylindrical portion 36.

As shown in FIGURE 3, the head end of the boring bar is gashed axially at three segments to provide mounting space for cutting inserts, the mounting wall for these inserts being shown at 40, 42 and 44 parallel to but spaced from a radial plane of the head and facing the direction of rotation of the head. The mounting of the cutting inserts is accomplished by a multiple pocket plate 46 shown in FIGURE 4, this plate being contoured at edge 48 and edge 50 to fit on the walls 40, 42 and 44. The plate is suitably doweled in place at holes 52. Along the outer edge of the plate 46 are pockets 54, 56, 58 and 60, each provided with slanted walls 62 to accommodate the beveled edges of cutting inserts 64, 66, 68 and 70, the first two of these inserts being triangular and the last two being square.

The surface of the plates 46 opposite the mounting surfaces are about coincident with a radial plane of the head for the positive cutting inserts beveled to provide cutting clearance at the extending edges. The inserts are held in place by clamping elements 74, 76, 78 and 80, each being held down by a headed screw 82 threadingly engaging the head. It will be noted in the drawings, FIGURES 1 and 3, that each clamp has a surface engaged with a wall of a gash in said boring bar so that each clamp is stabilized in its position on its respective plate 46.

The inserts are thus positively located on the boring bar faces 40, 42 and 44 and securely clamped in position in the respective recesses provided therefor. Since the recesses are all mounted in a single plate 46 the inserts are positively located relative to each other, and any loosening of the clamping plates for the inserts for purposes of indexing or replacing the inserts does not change the relative location of the inserts.

The boring bar is provided with a coolant channel 84 having three divergant passages 86 to the various segmental gashes of the unit.

What is claimed is as follows:

1. In a boring bar having a driving shank and a head portion provided with axial segmental gashes distributed circumferentially around the boring bar to provide flat supporting surfaces for cutting elements, that improvement which comprises a plurality of flat gashing plates disposed on a flat, substantially radial surface of the boring bar facing the direction of rotation, means for accurately locating said plates on said surfaces, each of said plates having on its outwardly facing edge a plurality of open-sided notches each having at least two sides for the support of an insert, an insert to be disposed in each of said notches having a thickness greater than that of said plates, each of said inserts having a plurality of cutting edges, each of which will project from said notches beyond the circumferential boundaries of said head, and a common clamping means for retaining said inserts in said notches and for retaining said plates on said boring bar comprising a plurality of individual clamping elements, one for each insert, each having a heel portion to fulcrum on said plates and a toe portion to overlie said notches and rest on an insert in each notch, and a screw means transfixing each of said clamps and said respective plate on which it is mounted anchored in said boring bar to exert a clamping force on said plates and said inserts.

2. A device as defined in claim 1 in which each of said clamping elements has a side edge engaged with a face of a gash in said boring bar angled to the face upon which the plates are located to serve as a locating and stabilizing face for each said clamp.

References Cited in the file of this patent
UNITED STATES PATENTS

| | | |
|---|---|---|
| 2,645,003 | Thompson | July 14, 1953 |
| 2,805,467 | Greenleaf | Sept. 10, 1957 |
| 2,893,110 | Gibson | July 7, 1959 |